Dec. 25, 1928.
A. F. WELCH
1,696,617
ELECTRORESPONSIVE CONTROLLING DEVICE
Filed March 29, 1927
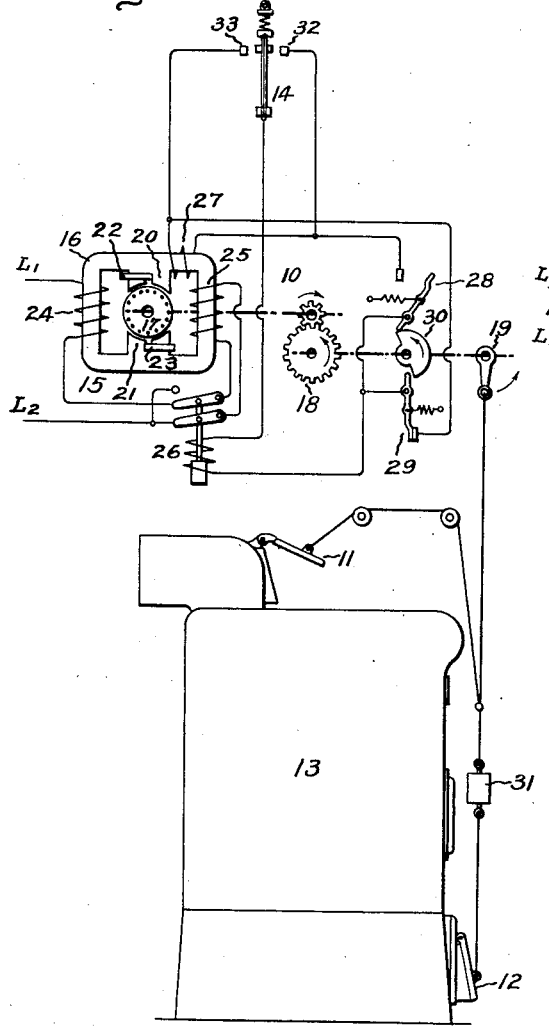
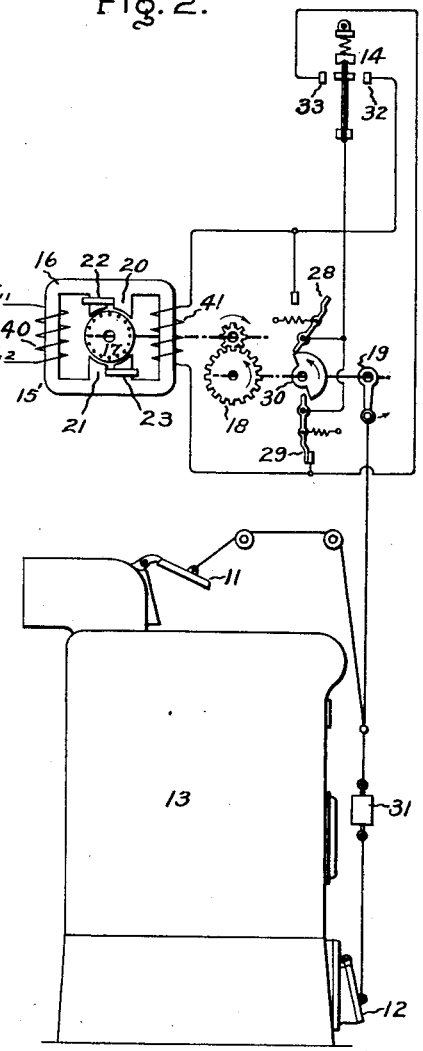
Inventor
Alfred F. Welch,
by *Alexander F. ____*
His Attorney.

Patented Dec. 25, 1928.

1,696,617

UNITED STATES PATENT OFFICE.

ALFRED F. WELCH, OF FORT WAYNE, INDIANA, ASSIGNOR TO GENERAL ELECTRIC COMPANY, A CORPORATION OF NEW YORK.

ELECTRORESPONSIVE CONTROLLING DEVICE.

Application filed March 29, 1927. Serial No. 179,231.

This invention relates to electroresponsive devices for controlling the operation of movable members such as dampers, valves, signals or the like, and it provides an improved form of controlling device of the above character that is particularly adapted for alternating current service and may be maintained connected to the energizing supply source at all times whether the device is in operation or at rest. Moreover, the improved electroresponsive controlling device has its windings arranged to provide a source of relatively low voltage alternating current for a master controlling switch such as a thermostat or the like which may be employed for controlling the operation of the electroresponsive controlling device.

While not necessarily limited thereto the electroresponsive controlling device of the present invention is particularly advantageous in controlling the operation of the dampers of a heating furnace under thermostatic master switch control. In such service the device serves both as a motor for actuating the draft dampers and as a transformer for supplying low voltage control current to the thermostat. Furthermore the motor actuating the draft dampers is set into operation and stopped in an improved manner and without interfering in any way with the winding supplying the low voltage control current by an improved construction of the motor. Briefly, this is accomplished by arranging the magnetic field construction of the motor so as to normally maintain the field flux out of operating relation with the motor armature and thereby maintain the latter inactive. A winding is associated with the magnetic field structure and is controlled in such manner that the field flux is forced into cooperating relation with the armature to start operation of the latter. The winding is under the control of the thermostatic master switch and also of suitable switch mechanism operated responsively to the rotation of the motor so as to automatically stop the motor after a predetermined rotation of the dampers.

The accompanying drawings illustrate thermostatic furnace draft control systems embodying the improved form of electroresponsive controlling device of the present invention.

Fig. 1 is a schematic diagram of a furnace damper control system employing a preferred form of controlling device, and Fig. 2 shows a furnace draft control system employing a control device having a somewhat simplified construction.

In Fig. 1 the electroresponsive controlling device 10 is mechanically connected to operate the flue damper 11 and the ash pit damper 12 of the heating furnace 13 under the automatic control of the thermostat 14 which is located in the room supplied with heat from the furnace 13. In the preferred form shown the control device 10 comprises an alternating current induction motor 15 having a magnetic field structure 16 and an armature 17. The armature is connected through the speed reducing gearing 18 to operate the damper shifting lever 19 as indicated diagrammatically in the drawing. The field structure of the motor is provided with suitable polar extensions 20 and 21 respectively having thereon the pole shading windings 22 and 23 for producing a rotating magnetic field to operate the armature 17 in a well known manner. The armature 17 preferably is of the squirrel cage type, as indicated. The magnetic field structure 16 is provided with an energizing winding 24 and a flux distribution controlling winding 25 which is connected to act either cumulatively or differentially with respect to winding 24 under the control of the electroresponsive switch 26.

The operating winding of the switch 26 is supplied with low voltage control current from the auxiliary winding 27 which is inductively related with the motor field windings 24 and 25 through the magnetic field structure 16. The energization of the switch 26 is controlled by the double acting circuit controlling thermostat 14 and the contacts 28 and 29 are arranged to be operated by the cam 30 to deenergize the winding of switch 26 after a predetermined operation of the motor, as will be pointed out more fully in connection with the operation of the controlling device which is as follows:

With the line terminals $L_1$ and $L_2$ for the energizing winding 24 and the flux controlling winding 25 connected to a suitable alternating current supply source, and with the switch 26 and the thermostat 14 in their respective positions, as shown, the windings 24 and 25 act cumulatively to set up an alternating current flux that is confined practically entirely to the magnetic field structure 16. Consequently, there is no flux supplied through the polar extensions 20 and 21 to the squirrel cage armature 17 and the latter remains at rest. The flux set up in the magnetic field structure 16 induces a voltage however in the auxiliary winding 27.

It will be noted that the controlling member 19 is shown in a position to permit the weight 31 to raise the check damper 11 and close the ash pit damper 12, thereby reducing the heating effect of the furnace 13.

The thermostat 14 in responding to the decreased heating effect of the furnace flexes to the right to engage with the contact 32. This connects the operating winding of the switch 26 to be energized from the motor auxiliary winding 27 through the contact 29 and the contact 32 of the thermostatic switch. As a result the switch 26 is operated from the position in which it is shown to its open position in which the flux controlling winding 25 is reversely connected to act differentially with respect to the energizing winding 24. Under these conditions the winding 24 and the winding 25 are opposed and both function to supply flux through the polar extensions 20 and 21 to set the motor armature 17 into operation. Thereupon the motor armature operates through the agency of the speed reducing gearing 18 to rotate the controlling member 19 in the direction of the arrows. This results in the controlling arm 19 raising the weight 31 to open the ash pit damper 12 and close the check damper 11. As the controlling member 19 is operated the cam 30 is also rotated in the direction of the arrow and serves to open the contact 29 and close the contact 28 when the controlling member 19 reaches the position in which the ash pit damper 12 is fully opened and the check damper 11 is fully closed.

The opening of the contact 29 interrupts the energizing circuit of the switch 26 and the latter thereupon returns to the position in which it is shown so as to again connect the flux controlling winding 25 to act cumulatively with the energizing winding 24. This results in depriving the motor armature 17 of operating flux and the armature immediately stops further rotation of the controlling member 19.

With the increased heating effect of the furnace 13 due to the opening of the ash pit damper 12 and the closing of the check damper 11, the thermostat 14 moves to the left out of engagement with the contact 32 and into engagement with the contact 33 and the operating winding of switch 26 again is connected to be energized from the auxiliary winding 27 of the motor. In this case the circuit extends through the contact 28 and the contact 33 of the thermostat. The resulting operation of the switch 26 to reverse the connections of the flux controlling winding 25 to start operation of the motor armature 17 is exactly the same as previously described. However, the controlling member 19 is returned to its initial position in which the ash pit damper 12 is closed and the check damper 11 is opened. Further rotation of the motor is stopped by operation of the cam 30 to open the switch 28 and reclose the switch 29 thereby effecting the deenergization of the switch 26 and the resulting cumulative connection of the winding 25 in the same manner as previously pointed out.

Where it is desirable to eliminate the electroresponsive controlling switch 26 and permit the thermostat 14 to directly control the starting and stopping of the motor, the simplified arrangement shown in Fig. 2 may be employed. In this arrangement the alternating current induction motor 15' is provided with an energizing winding 40 which may be permanently connected to the alternating current supply lines and the winding 41 serves both as a source of low voltage controlling current for the thermostatic switch 14 as well as a controlling winding for the flux in the motor magnetic field structure 16.

With the simplified arrangement of Fig. 2, the magnetic field structure 16 normally serves to maintain the field flux out of cooperating relation with the armature 17 as long as the winding 41 is open circuited. Whenever the winding 41 is short-circuited the flux set up by the winding 40 is forced to pass through the polar extensions 20 and 21 into the armature 17 to thereby effect operation of the motor. The short circuiting of the winding 41 is controlled by the thermostatic switch 14 which operates into engagement with contact 32 in response to a decreased heating effect of the furnace 13, and into engagement with the contact 33 in response to an increased heating effect of the furnace 13 in exactly the same manner as previously described. The operation of the controlling member 19 to alternately open and close the ash pit damper 12 and the check damper 11 of the furnace also is the same as noted above. The cam operated contacts 28 and 29, however, function alternately to interrupt the short circuit of the winding 41 established by the thermostatic switch 14 after a limited rotation of the motor in a manner which will be obvious.

From the foregoing it will be seen that the improved controlling device of the present invention serves not only to actuate a suitable controlling member but also provides a simple and effective way of controlling the operation of the device. In each case the motor magnetic field structure remains energized when the motor armature is stopped as well as when the motor armature is operating. Moreover, the low voltage control circuit for the thermostatic switch is obtained directly from the motor itself without the necessity of any auxiliary transformer or independent source of supply.

What I claim as new and desire to secure by Letters Patent of the United States, is:

1. An alternating current electroresponsive controlling device comprising an induction motor having a short-circuited rotatable armature and a normally energized magnetic field structure having poles adjacent said armature and providing a closed flux path independent of said armature to prevent inducing operating current therein, and means comprising a winding associated with said magnetic structure for forcing the field flux through said poles into inductive relation with the armature, and pole shading windings associated with said poles to effect rotation of the armature.

2. An alternating current electroresponsive controlling device comprising an induction motor having a short-circuited rotatable armature, a normally energized magnetizing winding therefor, a magnetic field structure having pole shading windings cooperating with said magnetizing winding to effect rotation of the armature, said structure providing a closed flux path independent of said armature, and means for selectively controlling the distribution of flux between said armature and said closed flux path to effect and prevent induction of operating current in the motor armature.

3. An alternating current electroresponsive controlling device comprising an alternating current induction motor having a short-circuited rotatable armature and a normally energized magnetizing winding therefor, a magnetic structure cooperating with said field winding, and electrical control means including a second winding inductively energized from said normally energized winding for controlling the distribution of flux in said magnetic structure to effect and prevent induction of operating current in the motor armature.

4. An alternating current electroresponsive controlling device comprising an alternating current induction motor having a short-circuited rotatable armature and a normally energized magnetic field structure providing a closed path for the alternating flux independent of the armature and provided with polar extensions having pole shading windings thereon for supplying a rotating field flux to effect operation of the armature, and a flux controlling winding associated with said normally energized magnetic structure for controlling the distribution of flux between said closed flux path and said polar extensions to start and stop operation of the motor armature.

5. An alternating current electroresponsive controlling device comprising an alternating current induction motor having a short-circuited rotatable armature and a magnetic field structure provided with polar extensions having pole shading windings thereon for supplying a rotating field flux to the armature and forming a closed magnetic circuit independent of said polar extensions, a normally energized magnetizing winding for said magnetic structure, and a flux controlling winding associated with said closed magnetic circuit for controlling the flow of flux through said polar extensions to start and stop operation of the motor armature.

6. An alternating current electroresponsive controlling device comprising an alternating current induction motor having a short-circuited rotatable armature and a magnetic field structure provided with polar extensions having pole shading windings thereon for supplying a rotating field flux to the armature and forming a closed magnetic circuit independently of said polar extensions, a normally energized magnetizing winding for said magnetic structure, a second winding associated with said closed magnetic circuit, and means for controlling the said winding to restrain the flow of flux in the closed magnetic circuit and thereby force the flux through said polar extensions to effect operation of the motor armature and to permit the flow of flux in said closed magnetic circuit to prevent operation of the motor armature.

7. An alternating current electroresponsive controlling device comprising an alternating current induction motor having a short circuited rotatable armature and a magnetic field structure providing polar extensions having pole shading windings thereon for supplying a rotating field flux to the armature and a closed magnetic circuit independent of the armature, a normally energized magnetizing winding for said magnetic structure, and electrical control means including a winding inductively energized from said normally energized magnetizing winding, for controlling the flux in said closed magnetic circuit to start and stop operation of the motor armature.

8. An electroresponsive controlling device comprising an alternating current motor having a squirrel cage rotatable armature and a magnetic field structure providing polar extensions for the armature and a closed magnetic circuit independent of the armature, pole shading windings located upon said polar extensions, and a pair of normally energized cooperating windings associated with said magnetic structure to act differentially to supply operating flux to the motor armature and to act cumulatively to deprive the motor armature of operating flux and means for controlling the cumulative and differential connection of said windings to control the starting and stopping of the motor armature.

9. An alternating current electroresponsive controlling device comprising a movable controlling member, an alternating current induction motor having a short-circuited rotatable armature connected to operate said controlling member, a normally energized magnetic field structure having poles provided with pole shading windings for supplying a rotating field flux to said short-circuited armature, said structure providing a closed flux path for maintaining the field flux out of inductive relation with the short-circuited armature, and means comprising a winding under the control of said movable controlling member for forcing the field flux into inductive relation with the armature to cause operation thereof.

10. An electroresponsive controlling device comprising a motor having a rotatable armature and a normally energized magnetic field structure therefor, a low voltage circuit controlling device for controlling the starting and stopping of the motor, and a winding associated with the magnetic field structure of the motor for supplying a relatively low voltage current to said device.

11. A thermostatic controlling device comprising a motor having a rotatable armature and a normally energized magnetic field structure therefor, a thermostatic switch for controlling the starting and stopping of the motor, and a winding associated with the said magnetic field structure of the motor for supplying a relatively low voltage current to said thermostatic switch.

12. A thermostatic controlling device comprising an alternating current motor having a squirrel cage rotatable armature and a magnetic field structure providing polar extensions for the armature and a closed magnetic circuit independently of the armature, a pair of windings associated with said field structure to act differentially to supply operating flux through said polar extensions to said armature and to act cumulatively to deprive said armature of operating flux, an electroresponsive switch mechanism for controlling the differential and cumulative connection of said winding, a winding associated with said magnetic structure for supplying energizing current at a relatively low voltage for said electroresponsive switch, and an automatic device operable in accordance with predetermined conditions for controlling the energization of said electroresponsive switch.

13. An electroresponsive controlling device comprising an alternating current motor having a squirrel cage rotatable armature and a magnetic field structure therefor providing polar extensions for the armature and a closed magnetic circuit independent of the armature, a magnetizing winding for said field structure, a second winding cooperating with said magnetizing winding to control the distribution of flux in said magnetic structure to effect operation of the motor armature and to maintain the motor armature inactive, means for controlling said winding to set the motor armature into operation, and means responsive to predetermined operation of the motor armature for controlling said winding to render the motor armature inactive.

In witness whereof, I have hereunto set my hand this 26 day of March 1927.

ALFRED F. WELCH.